(12) United States Patent
Ho

(10) Patent No.: US 6,416,351 B1
(45) Date of Patent: Jul. 9, 2002

(54) POWER SUPPLY CORD POSITIONING DEVICE FOR A LIGHTING UNIT

(75) Inventor: Hsien-Wen Ho, Tainan (TW)

(73) Assignee: Chi-Wen Chen, Taipei (TW)

( * ) Notice: Subject to any disclaimer, the term of this patent is extended or adjusted under 35 U.S.C. 154(b) by 0 days.

(21) Appl. No.: 09/836,982

(22) Filed: Apr. 18, 2001

(51) Int. Cl.$^7$ .............................................. H01R 13/56
(52) U.S. Cl. ....................................... 439/447; 439/465
(58) Field of Search .......................... 439/447, 465–467

(56) References Cited

U.S. PATENT DOCUMENTS

| | | | | |
|---|---|---|---|---|
| 3,665,374 A | * | 5/1972 | Denton ........................ | 439/447 |
| 3,858,160 A | * | 12/1974 | Denton ........................ | 439/447 |
| 5,295,859 A | * | 3/1994 | Kawai et al. ................ | 439/447 |
| 5,586,916 A | * | 12/1996 | Shinji et al. ................. | 439/467 |
| 5,588,870 A | * | 12/1996 | Boteler et al. ............... | 439/467 |
| 6,050,847 A | * | 4/2000 | Kawakami et al. .......... | 439/447 |
| 6,068,506 A | * | 5/2000 | Shen ............................ | 439/447 |
| 6,155,866 A | * | 12/2000 | Liu et al. ..................... | 439/447 |

* cited by examiner

*Primary Examiner*—Gary Paumen
(74) *Attorney, Agent, or Firm*—Harness, Dickey & Pierce, P.L.C.

(57) ABSTRACT

A positioning device includes a surrounding wall integrally formed with a shell of a lighting unit. The surrounding wall includes a mounting wall area with left and right lateral edge portions which are in water-tight and detachable engagement with each other, and which include left and right abutment wall surfaces with cutout portions defining an inner surrounding clamping wall surface that confines an insert hole for receiving an insert member which wraps around a power supply cord. The insert member has a neck segment that is spaced apart from the clamping wall surface by a surrounding clearance which can accommodate thermal expansion of the mounting wall area and which can form a moisture barrier against intrusion of water vapor.

6 Claims, 6 Drawing Sheets

POWER SUPPLY CORD POSITIONING DEVICE FOR A LIGHTING UNIT

BACKGROUND OF THE INVENTION

1. Field of the Invention

The invention relates to a power supply cord positioning device for a lighting unit, more particularly to a positioning device for securing a power supply cord inserted into a lighting unit, which ensures water-tightness and which can accommodate thermal expansion of a plastic shell of the lighting unit.

2. Description of the Related Art

With reference to FIGS. 1 and 2, a conventional lighting unit 1, such as a night lamp, is electrically connected to a power supply source via a power supply cord 11, and generally includes a plastic, light transmissive shell 12 and a power supply cord jacket 13. The shell 12 includes left and right shell halves 122, 121 which mate with each other to cooperatively confine a light bulb receiving chamber. One side of the shell 12 is provided with an outer mounting wall 123. An inner mounting wall 124 is disposed inwardly of and parallel to the outer mounting wall 123. The outer mounting wall 123 is formed with a transverse outer hole 125. The inner mounting wall 124 is formed with an inner hole 126 corresponding to the outer hole 125. The power supply cord jacket 13 is mounted in the outer and inner holes 125, 126, and includes a surrounding jacket wall 131 that defines a transverse cord hole 132 for passage of the power supply cord 11. The surrounding jacket wall 131 includes a clamped section 133 that is clamped between the outer and inner holes 125, 126, an enlarged inner positioning section 134 that extends from one end of the clamped section 133 toward the shell 12, and an enlarged outer positioning section 135 that extends from the other end of the clamped section 133 outwardly of the outer mounting wall 123 so as to abut against the latter. In other words, the clamped section 133 has a surrounding wall 136 with a width or diameter that is reduced with respect to the inner and outer positioning sections 134, 135.

In order to ensure water-tightness of the lighting unit 1, the surrounding wall 136 of the power supply cord jacket 13 is in tight fit with the inner and outer holes 126, 125 in the shell 12. Therefore, when the power supply cord jacket 13 is installed on the shell 12, the tight fit between the surrounding wall 136 and the inner and outer holes 126, 125 prevents entry of water vapor into the receiving chamber within the shell 12. Nonetheless, since the plastic shell 12 may expand or contract under temperature influences and may age with the passage of time, and under the circumstance that the power supply cord jacket 13 and the shell 12 are in tight fit, the shell 12 may easily crack, thereby affecting the water-tightness effect of the lighting unit 1. If dampness gains entry into the receiving chamber of the shell 12, corrosion and short circuit may occur. The service life of the lighting unit 1 may also be shortened.

SUMMARY OF THE INVENTION

Therefore, the object of the present invention is to provide a positioning device for securing a power supply cord inserted into a lighting unit, which ensures water-tightness and which can accommodate thermal expansion of a plastic shell of the lighting unit.

Accordingly, a positioning device of the present invention is adapted for securing a power supply cord inserted into a lighting unit which includes a light transmissive shell confining an accommodation chamber and having a lower inner peripheral edge portion which defines a lower opening to communicate with the accommodation chamber. A lighting source is disposed in the accommodation chamber and is electrically connected to the power supply cord. The positioning device includes a bottom wall with a periphery, a surrounding wall, a tubular insert member, and a bracing member. The surrounding wall extends from the periphery in an upright direction, and is adapted to be integrally formed with the lower inner peripheral edge portion of the shell to close the accommodation chamber water-tightly. The surrounding wall includes a mounting wall area which has outer and inner mounting wall surfaces opposite to each other in a first transverse direction transverse to the upright direction. The mounting wall area includes left and right lateral edge portions that are separated along a split line extending in the upright direction and that are in water-tight and detachable engagement with each other. The left and right lateral edge portions respectively include left and right abutment wall surfaces which face each other in a second transverse direction transverse to both the upright direction and the first transverse direction, and which extend respectively in the first transverse direction to interconnect the outer and inner mounting wall surfaces. The left and right abutment wall surfaces respectively have left and right cutout portions which cooperate to form an inner surrounding clamping wall surface that confines an insert hole. The insert hole is of a first dimension and extends in the first transverse direction to communicate the outer and inner mounting wall surfaces. The inner surrounding clamping wall surface has inner left and right clamping wall segments which respectively extend inwardly and in the second transverse direction from the left and right abutment wall surfaces. The insert member includes outer and inner tubular wall surfaces opposite to each other in radial directions. The inner tubular wall surface is adapted to wrap around and to bring the power supply cord into the lighting unit. The outer tubular wall surface includes: a surrounding neck segment which has front and rear surrounding end portions opposite to each other in the first transverse direction and which is disposed to be surrounded by, and spaced apart from the inner surrounding clamping wall surface by a surrounding clearance which is of such a dimension as to accommodate thermal expansion of the mounting wall area and to form, as a result of surface tension of an initial water vapor trapped therein, a moisture barrier against intrusion of water vapor; an enlarged surrounding head segment extending from the rear surrounding end portion in the first transverse direction and inwardly of the inner mounting wall surface so as to abut against the inner mounting wall surface; and a surrounding abutment segment extending from the front surrounding end portion in the first transverse direction and outwardly of the outer mounting wall surface so as to abut against the outer mounting wall surface. The bracing member is disposed between the inner surrounding clamping wall surface and the neck segment of the insert member.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
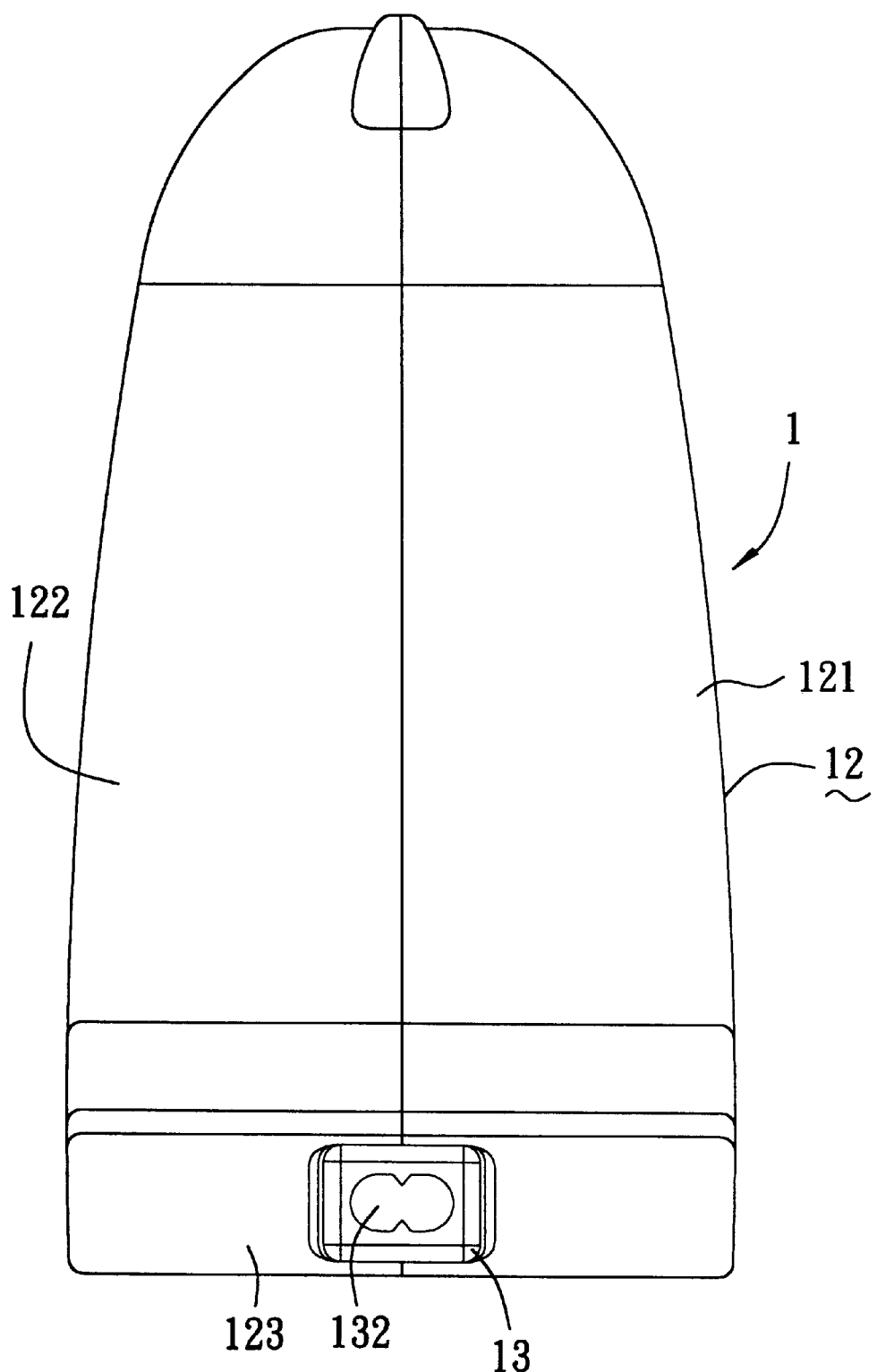
FIG. 1 is a side view of a conventional lighting unit in an assembled state.

Referring to FIGS. 3 to 6, the preferred embodiment of a positioning device according to the present invention is shown to be adapted for securing a power supply cord 20 inserted into a lighting unit 2 which includes a light transmissive shell 3 confining an accommodation chamber 33. In this embodiment, the shell 3 includes left and right shell halves 32, 31 respectively molded from plastic. The shell 3 has a lower inner peripheral edge portion which defines a lower opening communicated with the accommodation chamber 33. A lighting source (not shown), such as a light bulb, is disposed in the accommodation chamber 33 and is electrically connected to the power supply cord 20.

The positioning device is shown to include a bottom wall 310 with a periphery, a surrounding wall 320, a tubular insert member 5, a bracing member 4, and two pairs of a surrounding protrusion and a surrounding recess.

The surrounding wall 320 extends from the periphery of the bottom wall 310 in an upright direction, and is adapted to be integrally formed with the lower inner peripheral edge portion of the shell 3 to close the accommodation chamber 33 water-tightly. The surrounding wall 320 includes a mounting wall area which has outer and inner mounting wall surfaces 34, 35 opposite to each other in a first transverse direction transverse to the upright direction, and a gap 36 of a determined width therebetween. The mounting wall area includes left and right lateral edge portions that are separated along a split line extending in the upright direction and that are in water-tight and detachable engagement with each other (see FIG. 5). The left and right lateral edge portions respectively include left and right abutment wall surfaces 321, 322 facing each other in a second transverse direction transverse to both the upright direction and the first transverse direction, and extending respectively in the first transverse direction to interconnect the outer and inner mounting wall surfaces 34, 35. The left and right abutment wall surfaces 321, 322 respectively have left and right cutout portions which cooperate to form an inner surrounding clamping wall surface 371 that confines an insert hole 37 which is of a first dimension and which extends in the first transverse direction to communicate the outer and inner mounting wall surfaces 34, 35. In this embodiment, the insert hole 37 is a generally rectangular hole, but it may have any other suitable geometrical shape. The inner surrounding clamping wall surface 371 has inner left and right clamping wall segments 331, 332, which respectively extend inwardly and in the second transverse direction from the left and right abutment wall surfaces 321, 322.

The insert member 5 includes outer and inner tubular wall surfaces 51, 52 opposite to each other in radial directions. The inner tubular wall surface 52 confines a cord hole adapted to wrap around and to bring the power supply cord 20 into the lighting unit 2. The outer tubular wall surface 51 includes a surrounding neck segment 53, an enlarged surrounding head 54, and a surrounding abutment segment 55. In this embodiment, each of the surrounding neck segment 53, the enlarged surrounding head 54 and the surrounding abutment segment 55 has a generally rectangular cross-section. Certainly, the cross-section may be circular or any other desirable geometric shape.

The surrounding neck segment 53 has front and rear surrounding end portions opposite to each other in the first transverse direction, and is disposed to be surrounded by, and spaced apart from the inner surrounding clamping wall surface 371 by a surrounding clearance 534, which is of such a dimension as to accommodate thermal expansion of the mounting wall area. In this embodiment, the surrounding clearance 534 is approximately 0.05 to 0.08 mm wide.

The enlarged surrounding head segment 54 extends from the rear surrounding end portion in the first transverse direction and inwardly of the inner mounting wall surface 35 so as to abut against the inner mounting wall surface 35.

The surrounding abutment segment 55 extends from the front surrounding end portion in the first transverse direction and outwardly of the outer mounting wall surface 34 so as to abut against the outer mounting wall surface 34. Both of the enlarged surrounding head segment 54 and the surrounding abutment segment 55 have a larger diameter or width than that of the surrounding neck segment 53.

The surrounding protrusion and surrounding recess of each pair are respectively disposed on the inner surrounding clamping wall surface 371 and one of the front and rear surrounding end portions. In this embodiment, front and rear surrounding protrusions 533, 532 are respectively formed on the front and rear surrounding end portions, whereas outer and inner surrounding recesses 372, 382 are respectively provided on the inner surrounding clamping wall surface 371 proximate to the outer and inner mounting wall surfaces 34, 35. When the front and rear surrounding protrusions 533, 532 mate with the outer and inner surrounding recesses 372, 382, they surround an inserting line oriented in the first transverse direction and are spaced apart from the corresponding surrounding recesses 372, 382 by a corresponding section of the surrounding clearance 534 so as to form, as a result of the surface tension of an initial water vapor trapped therein, a moisture barrier against intrusion of water vapor.

Figure 5:
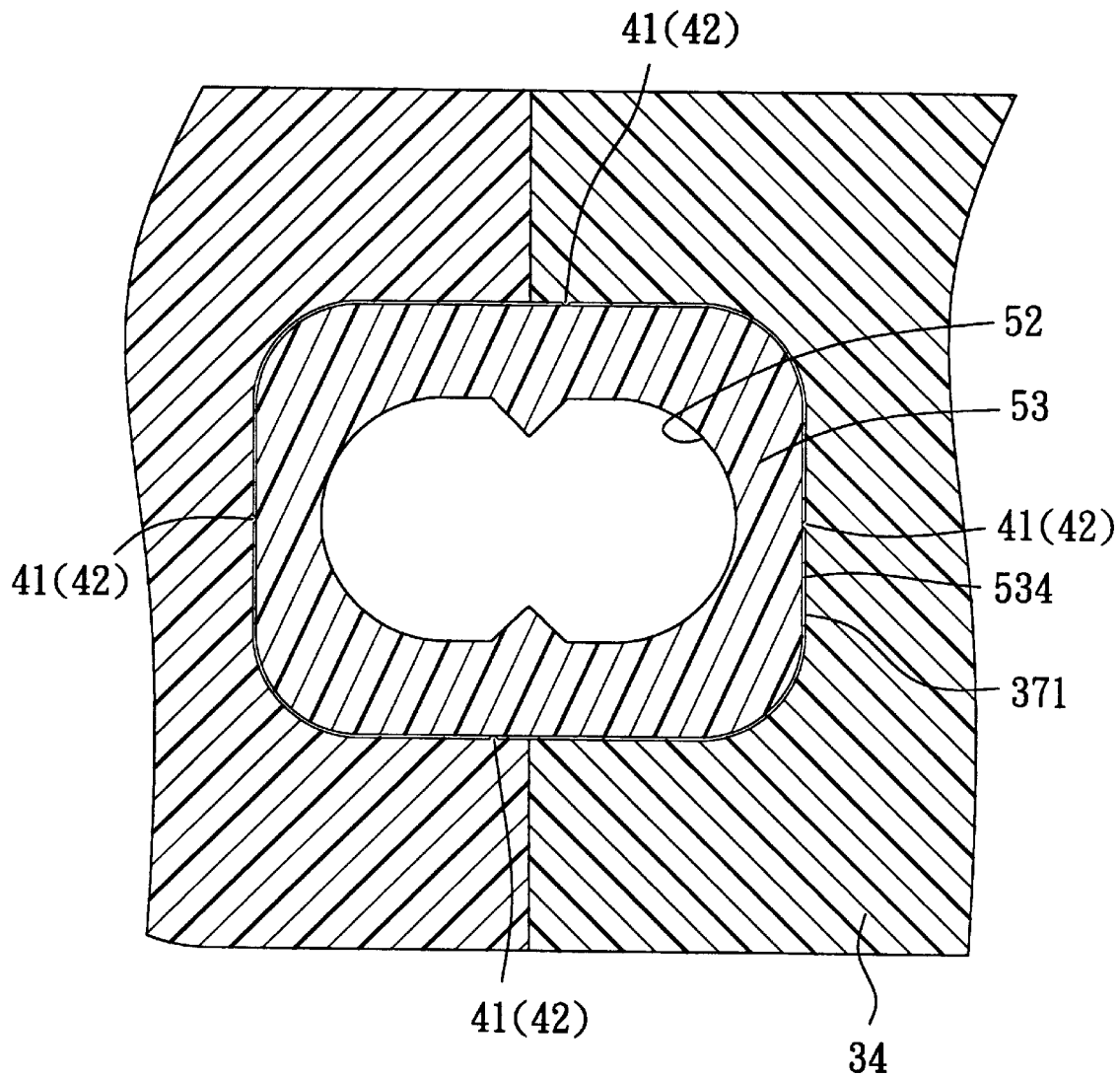
FIG. 5 is a fragmentary sectional view illustrating how an insert member is supported by a bracing member within an insert hole.
Figure 6:
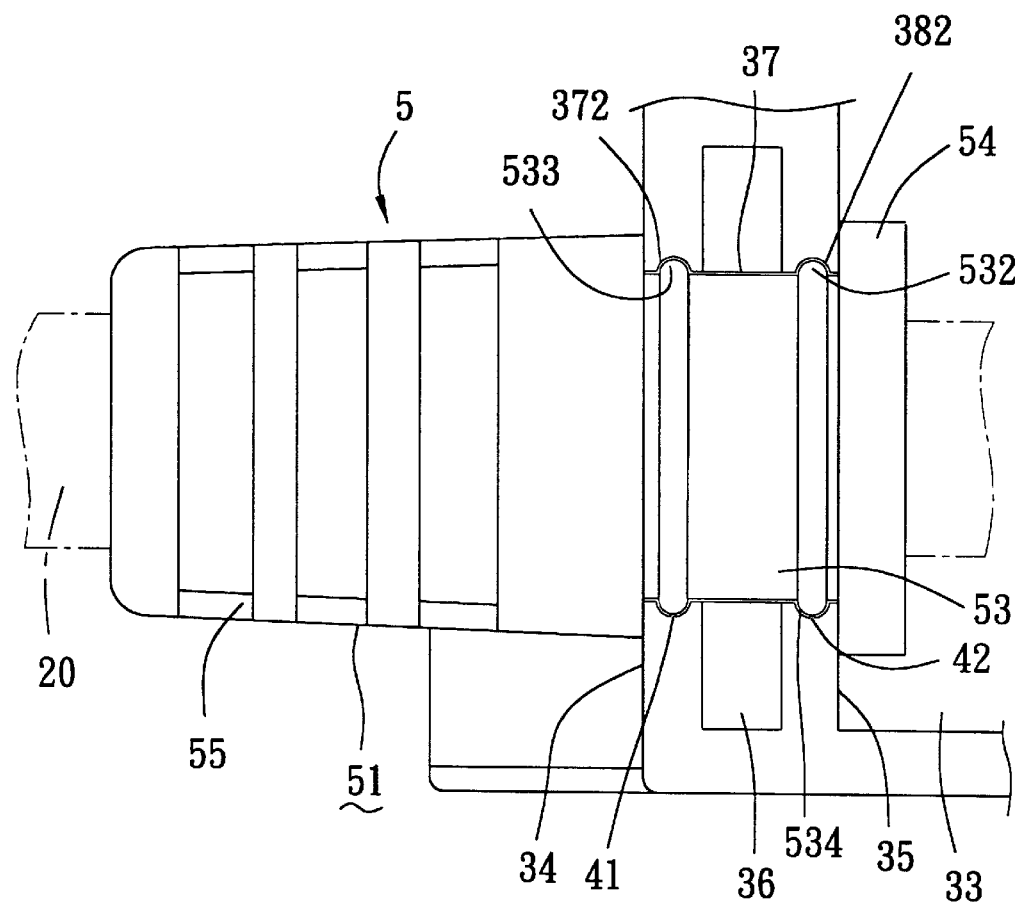
FIG. 6 is a fragmentary side view illustrating how the insert member is positioned within the insert hole.

With reference to FIGS. 5 and 6, the bracing member 4 is disposed between the inner surrounding clamping wall surface 371 and the surrounding neck segment 53 of the insert member 5. In this embodiment, the bracing member 4 includes four outer beads 41 spacedly disposed in the outer surrounding recess 372 and four inner beads 42 spacedly disposed in the inner surrounding recess 382. Preferably, the outer and inner beads 41, 42 project for a distance of 0.05~0.08 mm from the corresponding surrounding recess 372, 382.

Figure 2:
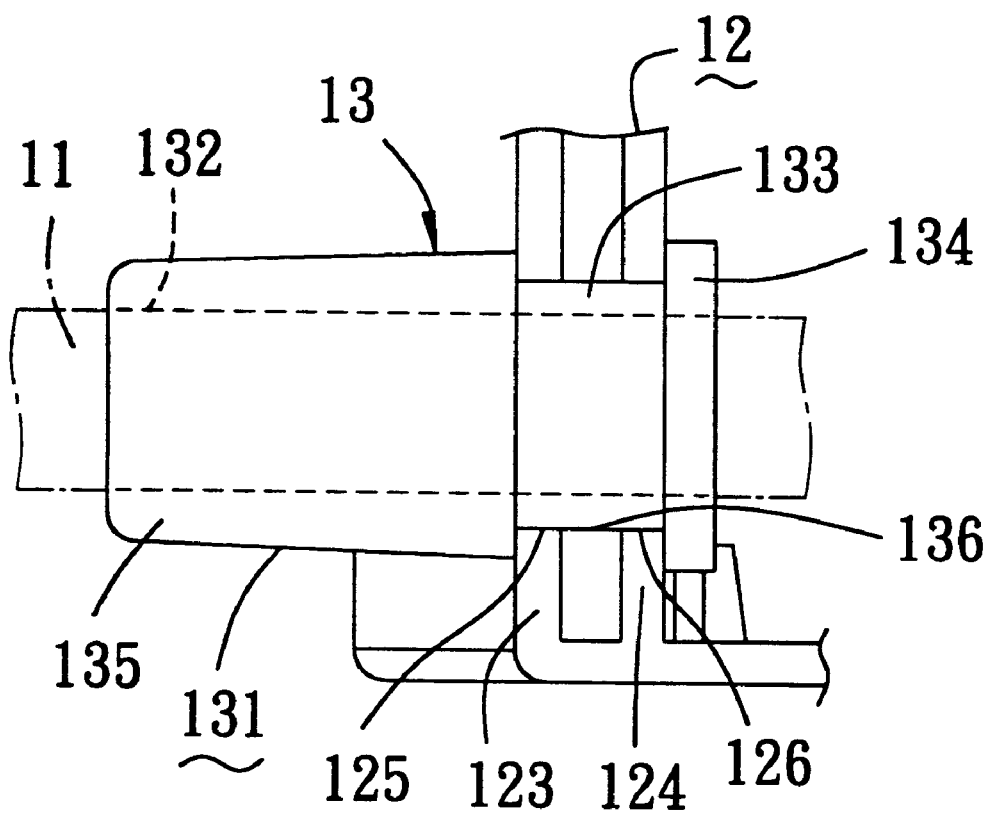
FIG. 2 is a fragmentary side view illustrating how a power supply cord jacket is positioned on outer and inner mounting walls of a shell of the lighting unit of FIG. 1.
Figure 3:
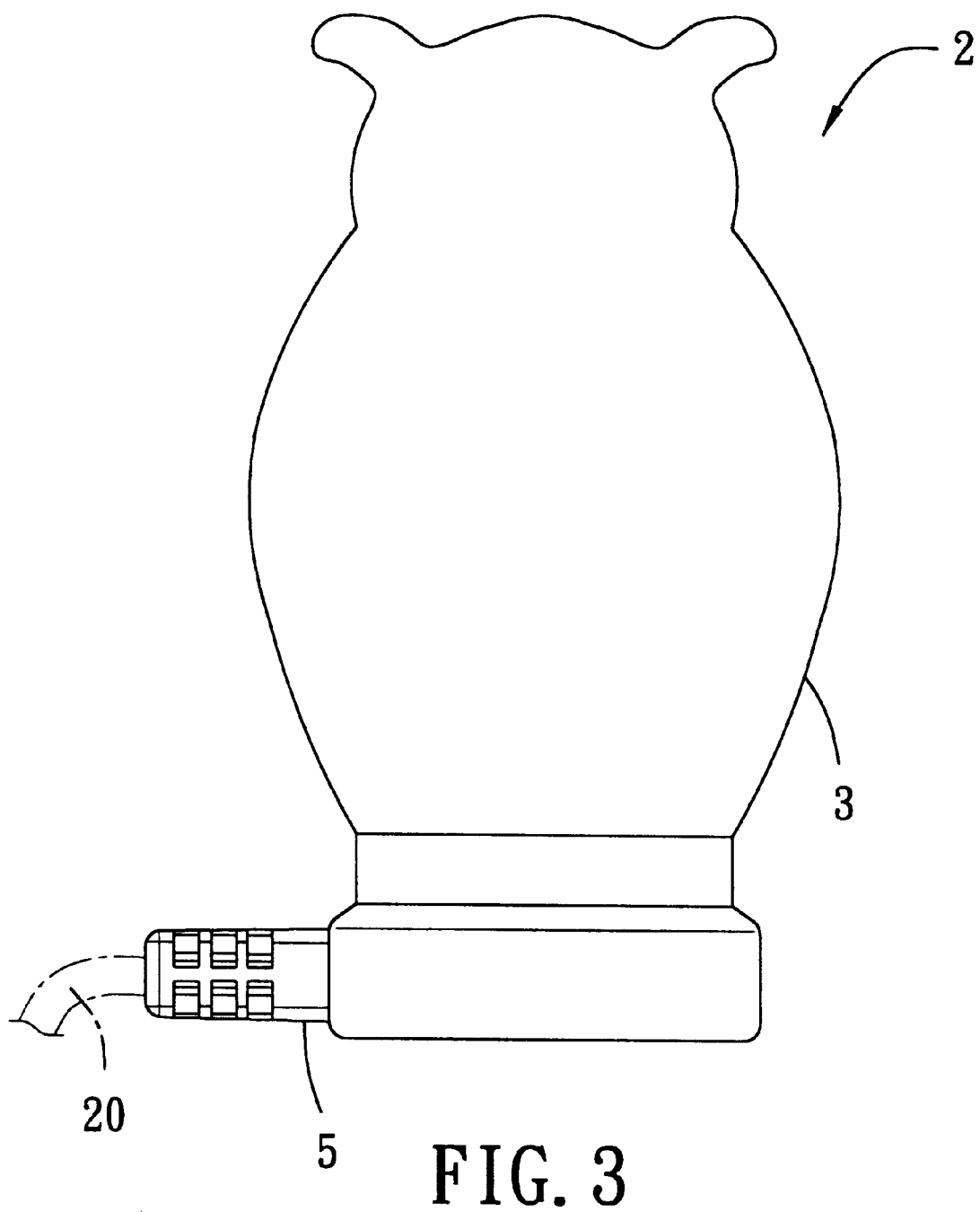
FIG. 3 is a schematic side view of a lighting unit embodying the preferred embodiment of a positioning device according to the present invention.
Figure 4:
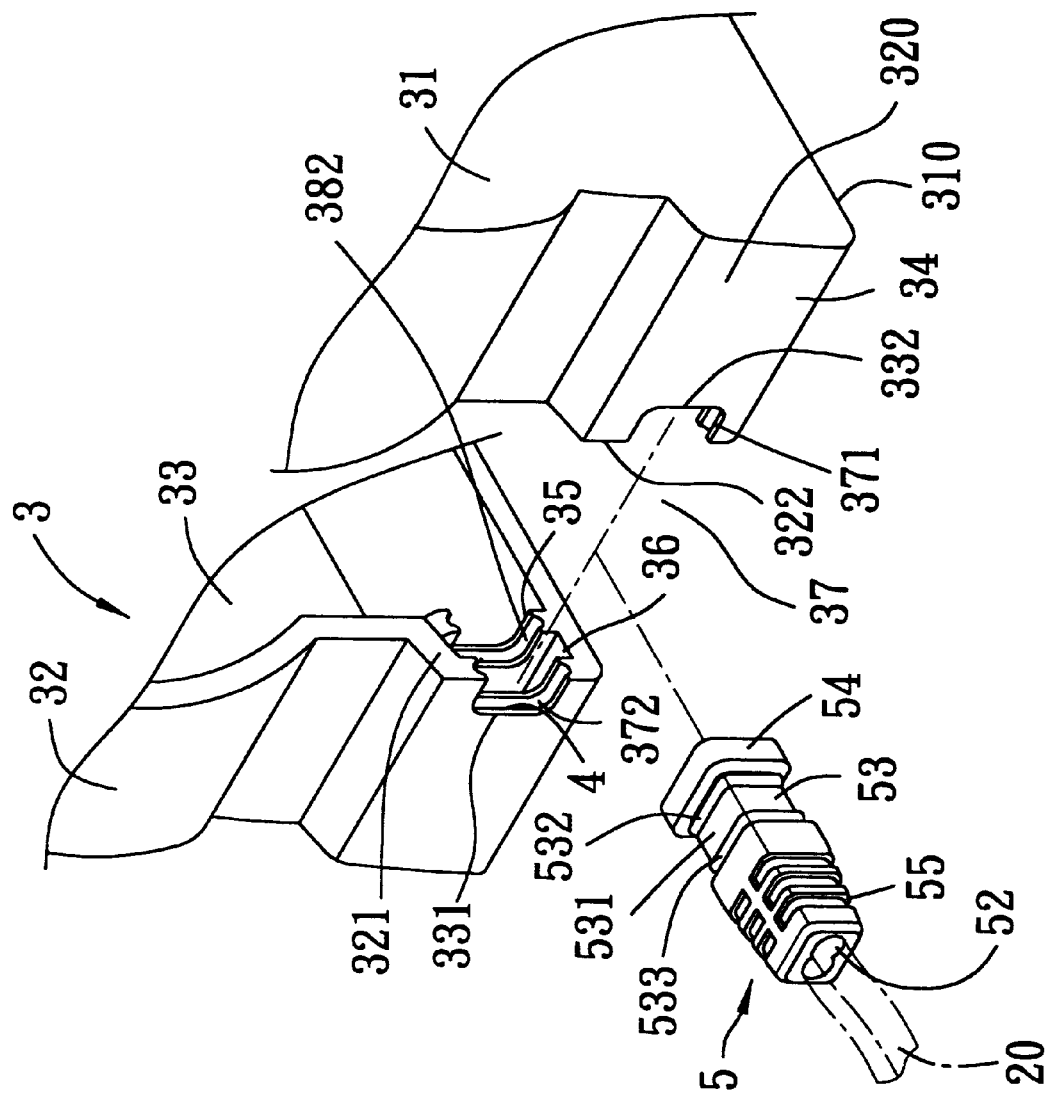
FIG. 4 is a fragmentary exploded perspective view of the preferred embodiment and the lighting unit.

Referring to FIGS. 2 and 6, after assembly of the lighting unit 2, the insert member 5 is inserted into the insert hole 37, with the surrounding neck segment 53 being in abutment with the beads 41, 42 on the outer and inner surrounding recesses 372, 382. The surrounding clearance 534 thus formed between the inner surrounding clamping wall surface 371 and the outer tubular wall surface 51 can accommodate any thermal expansion of the mounting wall area of the positioning device when the lighting unit 2 is subjected to temperature influences. For better effects, the insert member 5 and the mounting wall area are preferably formed from materials of different thermal expansion coefficients. Even if the shell 3 deforms in shape due to external factors, the presence of the surrounding clearance 534 can prevent cracking of the shell 3, which may affect the water-proof effect of the lighting unit 2. In addition, due to the arrangement of the protrusion and recess pairs, when water vapor gains entry into the surrounding clearance 534, it is trapped therein to form a moisture barrier which can block further entry of water vapor into the accommodation chamber 33. Thus, water-tightness can be ensured.

For the bracing member 4, the outer and inner beads 41, 42 can be alternatively formed on the surrounding neck segment 53 of the insert member 5.

In view of the aforesaid, it can be seen that the provision of a surrounding clearance in the shell of a lighting unit provides a space to accommodate thermal expansion of the shell and to form a moisture barrier to block entry of water vapor into the shell.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A positioning device for securing a power supply cord inserted into a lighting unit which includes a light transmissive shell confining an accommodation chamber and having a lower inner peripheral edge portion which defines a lower opening to communicate with the accommodation chamber, and a lighting source disposed in the accommodation chamber and electrically connected to the power supply cord, said positioning device comprising:

a bottom wall with a periphery;

a surrounding wall extending from said periphery in an upright direction and adapted to be integrally formed with the lower inner peripheral edge portion to close the accommodation chamber water-tightly, said surrounding wall including a mounting wall area which has outer and inner mounting wall surfaces opposite to each other in a first transverse direction transverse to the upright direction, said mounting wall area including left and right lateral edge portions that are separated along a split line extending in the upright direction and that are in water-tight and detachable engagement with each other, said left and right lateral edge portions respectively including left and right abutment wall surfaces facing each other in a second direction transverse to both the upright direction and the first transverse direction, and extending respectively in the first transverse direction to interconnect said outer and inner mounting wall surfaces, said left and right abutment wall surfaces respectively having left and right cutout portions which cooperate to form an inner surrounding clamping wall surface that confines an insert hole which is of a first dimension and which extends in the first transverse direction to communicate said outer and inner mounting wall surfaces, said inner surrounding clamping wall surface having inner left and right clamping wall segments which respectively extend inwardly and in the second transverse direction from said left and right abutment wall surfaces;

a tubular insert member including outer and inner tubular wall surfaces opposite to each other in radial directions, said inner tubular wall surface being adapted to wrap around and to bring the power supply cord into the lighting unit, said outer tubular wall surface including a surrounding neck segment which has front and rear surrounding end portions opposite to each other in the first transverse direction and which is disposed to be surrounded by, and spaced apart from said inner surrounding clamping wall surface by a surrounding clearance which is of such a dimension as to accommodate thermal expansion of said mounting wall area and to form, as a result of surface tension of an initial water vapor trapped therein, a moisture barrier against intrusion of water vapor, an enlarged surrounding head segment extending from said rear surrounding end portion in the first transverse direction and inwardly of said inner mounting wall surface so as to abut against said inner mounting wall surface, and a surrounding abutment segment extending from said front surrounding end portion in the first transverse direction and outwardly of said outer mounting wall surface so as to abut against said outer mounting wall surface; and a bracing member disposed between said inner surrounding clamping wall surface and said surrounding neck segment of said insert member.

2. The positioning device as claimed in claim 1, further comprising at least one pair of a surrounding protrusion and a surrounding recess which mate with each other and which are respectively disposed on said inner surrounding clamping wall surface and one of said front and rear surrounding end portions such that said surrounding protrusion and said surrounding recess, which surround an inserting line oriented in the first transverse direction, are spaced apart from each other by a section of said surrounding clearance.

3. The positioning device as claimed in claim 1, wherein said insert member and said mounting wall area are respectively formed from materials of different thermal expansion coefficients.

4. The positioning device as claimed in claim 1, wherein said bracing member includes a plurality of beads, said beads being spacedly provided on said inner surrounding clamping wall surface.

5. The positioning device as claimed in claim 1, wherein said bracing member includes a plurality of beads, said beads being spacedly provided in said surrounding recess.

6. The positioning device as claimed in claim 1, wherein said bracing member includes a plurality of beads, said beads being spacedly provided on said surrounding neck segment of said insert member.

* * * * *